United States Patent Office 3,804,805
Patented Apr. 16, 1974

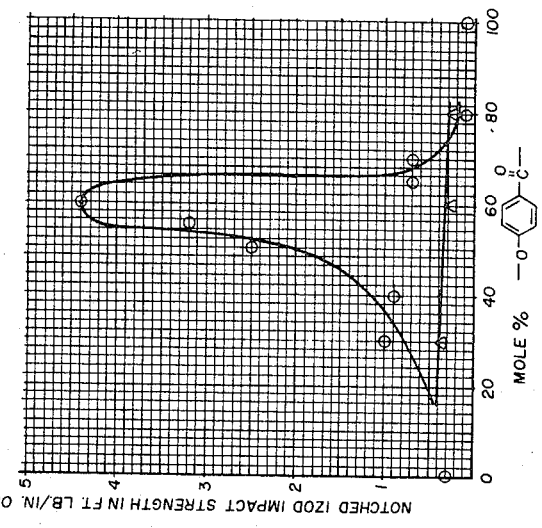
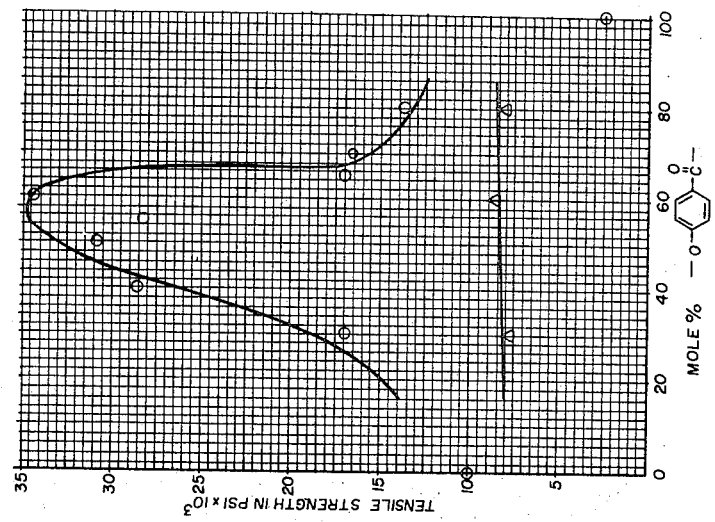
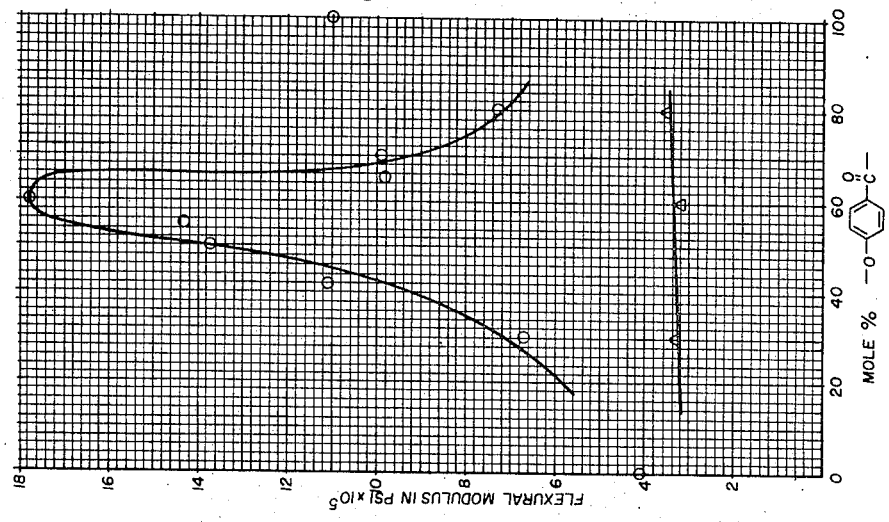

3,804,805
COPOLYESTER PREPARED FROM POLYETHYL-
ENE TEREPHTHALATE AND AN ACYLOXY
BENZOIC ACID
Herbert F. Kuhfuss and Winston J. Jackson, Jr., Kings-
port, Tenn., assignors to Eastman Kodak Company,
Rochester, N.Y.
Filed Dec. 1, 1972, Ser. No. 311,208
Int. Cl. C08g 17/02, 17/08
U.S. Cl. 260—47 C        11 Claims

ABSTRACT OF THE DISCLOSURE

Disclosed is a copolyester having no substantial amount of aliphatic to aromatic oxygen linkages, the copolyester being comprised of the following divalent radicals:

(A) 

(B) —OCH$_2$CH$_2$O—

(C) 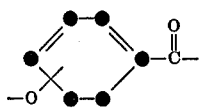

wherein the range of radical (C) is from 20 to 80 mole percent, based on the total moles of radical (A) and radical (C) combined. The copolyesters of this invention are prepared by a process comprised of two steps. The first step comprises forming a fragmented polyester by acidolysis of a starting polyester with an acyloxy benzoic acid. The second step comprises increasing the inherent viscosity of the fragmented polyester to form the copolyester of the invention. The starting polyester is formed from a dicarboxylic acid and ethylene glycol and contains a repeating unit composed of radical (A) attached to radical (B). When the acyloxy benzoic acid and starting polyester are contacted, acidolysis occurs and a fragmented polyester is formed. The inherent viscosity of the fragmented polyester is then increased to form the copolyester of the invention comprised of radicals (A), (B) and (C). Radical (A) of the copolyester is contributed from the dicarboxylic acid portion of the starting polyester, radical (B) of the copolyester is contributed from the ethylene glycol portion of the polyester and the acyloxy benzoic acid contributes radical (C) to the copolyester. Radical (C) will be recognized as the radical remaining after removal of the acyl and hydroxy groups from the acyloxy benzoic acid. The copolyesters of this invention exhibit unobvious mechanical properties.

This invention relates to a copolyester which exhibits unobvious mechanical properties. In a first embodiment of the invention the copolyester exhibits an unobviously high flexural modulus. In a second embodiment of the invention the copolyester exhibits the combination of unobviously high flexural modulus and unobviously high tensile strength. In a third embodiment of the invention the copolyester exhibits the combination of unobviously high flexural modulus, unobviously high tensile strength and unobviously high impact strength.

The use of objects molded from synthetic polymers has expanded rapidly in the last several decades. In particular, certain synthetic polymers, including polyesters, have gained acceptance for molding objects that will be subjected to high strength service. These synthetic polymers have mechanical properties sufficiently high that in some cases permit objects molded of these polymers to be substituted for objects formed from much stronger materials, such as ceramic and metallic materials.

Although many polyesters have mechanical properties that make the polyesters suitable for molding into useful objects, most polyesters are not suitable for high strength service since the mechanical properties of most polyesters are not sufficiently high. A few of the many known polyesters are suitable for high strength service if they are reinforced with a reinforcing agent such as glass fibers.

Applications have now invented a copolyester that exhibits mechanical properties sufficiently high to make the copolyester suitable for various kinds of high strength service without the necessity of a reinforcing agent.

Very broadly, the copolyester of this invention has no substantial amount of aliphatic to aromatic oxygen linkages and is comprised of the following divalent radicals:

(A) 

(B) —OCH$_2$CH$_2$O—

(C) 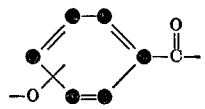

The prior art that applicant is aware of is U.S. 3,288,-755; U.S. 3,316,326; U.S. 3,418,276; Canadian 888,788; Canadian 893,194; Canadian 822,194; U.S. 2,728,742; U.S. 2,981,705; U.S. 2,981,706; U.S. 3,054,779; U.S. 2,471,023; Japanese 27,485/69 and Japanese 70/21,811.

The copolyester of this invention is literally distinguishable over the copolyesters of the prior art, such as the copolyesters disclosed in U.S. 3,288,755 or Canadian 888,788, because the structure of the molecular chain of the copolyester of this invention is different than the structure of the molecular chain of the copolyesters of the prior art. Specifically, the copolyester of this invention has no substantial amount of aliphatic to aromatic oxygen linkages, while copolyesters that are disclosed in the prior art, such as in Example 1 of U.S. 3,288,755 or Example 2 of Canadian 888,788, contain substantial amounts of aliphatic to aromatic oxygen linkages.

By the term "aliphatic to aromatic oxygen linkage" we mean an arrangement of atoms in the molecular chain of the polyester where a divalent oxygen atom is bonded between an aromatic structure and an aliphatic structure. As an example, consider a copolyester of the prior art formed from terephthalic acid, ethylene glycol and hydroxy benzoic acid. The copolyester will contain

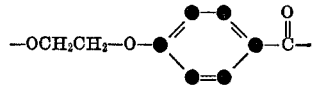

units formed by hydroxy-hydroxy condensation of ethylene glycol and the hydroxy group of the hydroxy benzoic acid. In this situation the aliphatic to aromatic linkage can be represented as

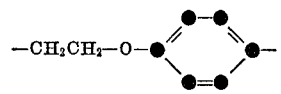

The distinction in the structure of the molecular chain of the copolyetherester of the prior art, containing substantial amounts of aliphatic to aromatic oxygen linkages, and the structure of the molecular chain of the copolyester of the invention, containing no substantial amounts of aliphatic to oxygen linkages, can readily be appreciated by referring to FIG. 1.

FIG. 1 represents comparative nuclear magnetic resonance (NMR) curves for both the copolyester of the invention and the copolyester of the prior art, such as disclosed in Example 1 of U.S. 3,288,755. These curves were prepared with solutions of the polyesters in trifluoroacetic acid, using a 60 mHz. Model A-60 Nuclear Magnetic Resonance Spectrometer manufactured by Varian Associates.

The copolyester of the prior art was prepared by ester interchanging dimethyl terephthalate, ethylene glycol and methyl p-hydroxybenzoate. The amount of methyl p-hydroxybenzoate was 60 mole percent, based on the total moles of terephthalic acid and methyl p-hydroxybenzoate. The general procedure of Example 1 of U.S. 3,288,755 was used to prepare the copolyester of the prior art.

The copolyester of the invention is prepared by contacting poly(ethylene terephthalate) with p-acetoxybenzoic acid. The amount of p-acetoxybenzoic acid is 60 mole percent, based on the total moles of terephthalic acid and p-acetoxybenzoic acid. The procedure used to prepare the copolyester of the invention will be subsequently disclosed in detail and is entirely different than the ester interchange procedure used to prepare the copolyester of the prior art.

Referring now to FIG. 1, there is indicated absorption peaks for the terephthalic acid residue and ethylene glycol residue in the NMR curves for both the copolyester of the prior art and the copolyester of the invention. As shown in FIG. 1 the NMR curve for the copolyester of the prior art also shows absorption peaks indicating the presence of an ethylene glycol-hydroxybenzoic acid residue This residue will be recognized as containing an aliphatic to aromatic oxygen linkage. Also, as shown in FIG. 1, the NMR curve for the copolyester of the invention does not show these absorption peaks but instead shows absorption peaks for a hydroxybenzoic acid-carbonyl group residue. This residue will be recognized as not containing an aliphatic to aromatic oxygen linkage.

Thus, these NMR curves illustrate that the copolyester of the prior art, formed from an ester interchange reaction, contains substantial amounts of aromatic to oxygen linkages, while the copolyester of the invention, which is formed by use of an entirely different process, contains no substantial quantities of aliphatic to aromatic oxygen linkages.

The copolyester of this invention has been described as containing "no substantial amount" of aliphatic to aromatic oxygen linkages. By the term "no substantial amount" we mean that the amount of aliphatic to aromatic oxygen linkages, if any, is below the detection ability of the NMR instrument. Quantitatively, this means that the amount of aliphatic to aromatic oxygen linkages, if any, is less han about 3 mole percent. Conversely, by the term "substantial amount" we mean that the amount of aliphatic to aromatic oxygen linkages in the copolyesters of the prior art is above the detection of the NMR instrument. Quantitatively, this means that the amount of aliphatic to aromatic oxygen linkages is more than about 3 mole percent.

The reaction of ethylene glycol with p-hydroxybenzoic acid to form the aliphatic to aromatic oxygen linkage is also discussed in Chemiefasern, 16 (10), 775 (1966), and some of the properties of the copolyetherester-modified poly(ethylene terephthalate) are described.

The copolyester of this invention is thought to be patentable over the prior art, such as disclosed in U.S. 3,288,755 and Canadian 888,788, because the copolyesters of this invention exhibit mechanical properties that are unobvious over the mechanical properties that one would expect of these copolyesters based on the prior art.

FIGS. 2, 3, and 4 represent graphs of important mechanical properties of both the coplyesters of the prior art and the copolyesters of the invention.

FIG. 2 represents the flexural modulus, or stiffness, of the copolyester of the invention and the flexural modulus of the copolyester of the prior art when the amount of the

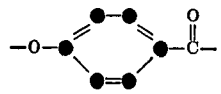

radical is varied over a range of 20 to 80 mole percent, based on the total moles of the radical and the dicarboxylic acid used to prepare the copolyester.

FIG. 3 is similar to FIG. 2 but represents the tensile strength of the copolyester of the invention and the tensile strength of the copolyester of the prior art.

FIG. 4 is similar to FIGS. 2 and 3 but represents the impact strength of the copolyester of the invention and the copolyester of the prior art.

Figure 1:
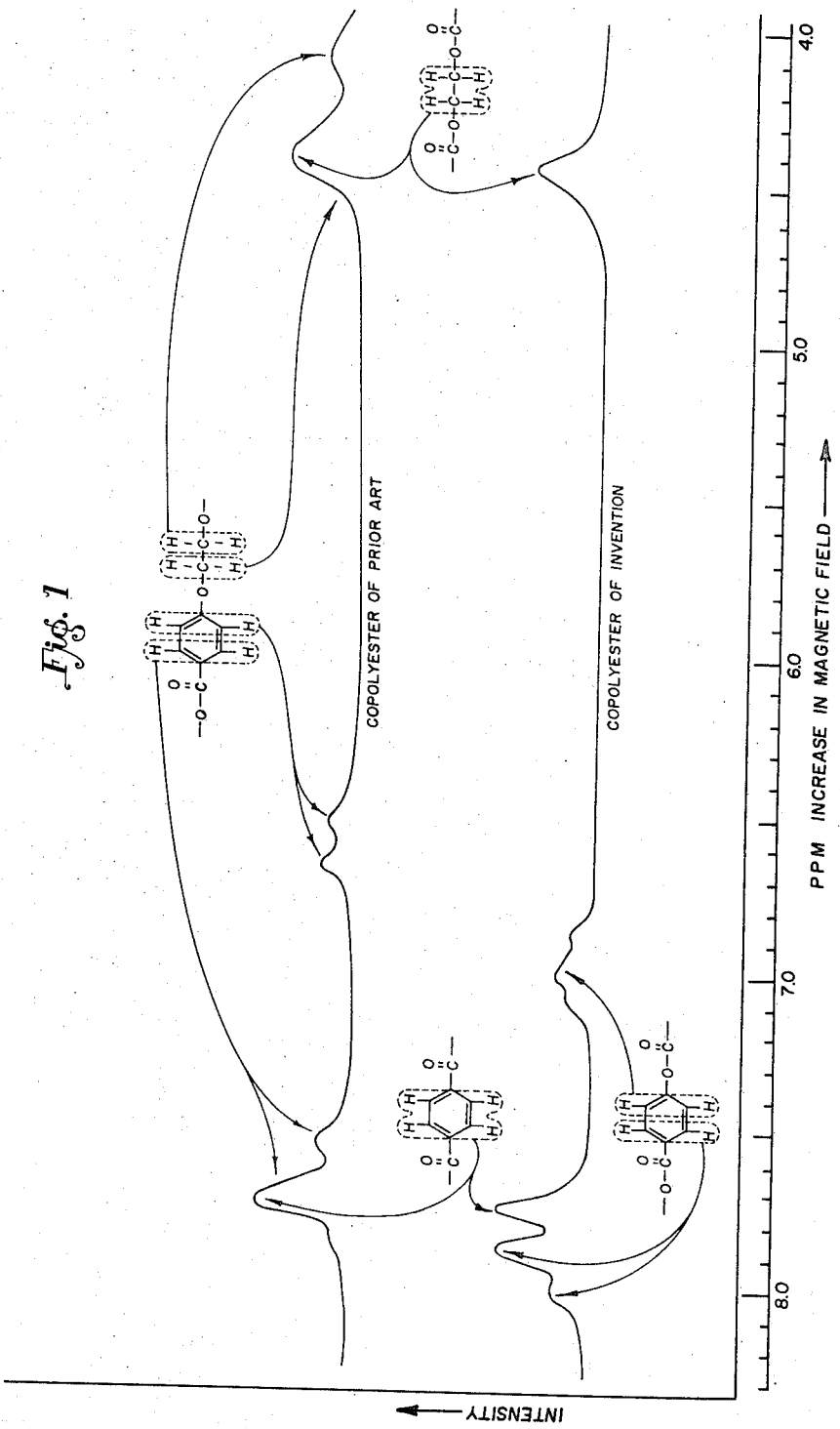

The copolyester of FIGS. 2, 3 and 4 is prepared by a procedure to be subsequently disclosed in detail using a polyester of terephthalic acid and ethylene glycol and an amount of p-acetoxybenzoic acid varying from 0 to 100 mole percent. Inherent viscosities of the copolyester of the invention are 0.50 to 0.70. The value for the homopolyester of p-hydroxybenzoic acid, described in Encycl. Polym. Sci. Technol., 1971, 15, 292–306, is determined with Ekonol, a product of the Carborundum Company. The copolyesters of the prior art represented in FIGS. 2, 3, and 4 are prepared by the ester interchange method disclosed in Example 1 of U.S. 3,288,755. This copolyester is prepared from dimethyl terephthalate, ethylene glycol and a varying amount of methyl p-hydroxybenzoate. Inherent viscosities of the copolyesters of the prior art are 0.68 to 0.90.

Referring now to FIG. 2, it is to be observed that the flexural modulus of the copolyesters of the prior art are about 3.0 to $3.5 \times 10^5$ p.s.i., which is about the flexural modulus typical for polyesters of this general type. In contrast, it is to be observed that within the range of about 20 to about 80 mole percent of the

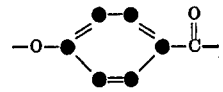

radical the flexural modulus of the copolyester of the invention, containing no substantial amount of aliphatic to aromatic oxygen linkage, is unobviously high when compared to the flexural modulus of the copolyesters of the prior art containing substantial amounts of aliphatic to aromatic oxygen linkages. Specifically, the flexural modulus in this range is at least a value in the order of about $5.8 \times 10^5$ p.s.i., and is which higher in all other parts of this range, while the flexural modulus of the copolyesters of the prior art is less than $5 \times 10^5$ p.s.i. Also, it is to be observed that within the range of 30 to 80 mole percent the flexural modulus is at least a value in the order of about $7.2 \times 10^5$ p.s.i. The flexural modulus is at least a value in the order of $10 \times 10^5$ p.s.i. within the range of 45 to 65 mole percent. The maximum flexural modulus occurs at about 60 mole percent where the flexural modulus is a value in the order of about $17.8 \times 10^5$ p.s.i.

Referring now to FIG. 3, it is to be observed that the tensile strength of the copolyesters of the prior art is about 7500 to 8500 p.s.i., which is about the tensile strength typical for polyesters of this general type. By way of contrast, it is to be observed that within the range of about 20 to about 80 mole percent of the

radical the tensile strength of the copolyesters of the invention is unobviously high when compared to the tensile strength of the copolyesters of the prior art. Within this range the tensile strength of the copolyester of the invention is at least a value in the order of about 13,000 p.s.i. while the tensile strength of the copolyesters of the prior art is not more than a value in the order of about 9000 p.s.i. Within the range of about 30 to about 68 mole percent the tensile strength is a value in the order of at least about 16,000 p.s.i. Within the range of 45 to 65 mole percent the tensile strength is a value in the order of at least about 25,000 p.s.i. The maximum tensile strength occurs at about 60 mole percent and is a value in the order of about 34,000 p.s.i.

Referring now to FIG. 4, it is to be observed that within the range of 45 to 65 mole percent the impact strength of the copolyesters of the invention is unobviously high when compared to the impact strength of the copolyesters of the prior art. Within this range the impact strength of the copolyesters of the invention is a value in the order of at least about 1.5 ft.-lb./in. of notch while the impact strength of the copolyesters of the prior art is less than a value in the order of 0.4 ft.-lb./in. of notch. The maximum impact strength occurs at a value in the order of about 60 mole percent as did the maximum values of flexural modulus and tensile strength.

Broadly, the first embodiment of this invention, wherein the flexural modulus is unobviously high, can be described as a copolyester having an inherent viscosity of at least 0.4 and having no substantial amount of aliphatic to aromatic oxygen linkages, the copolyester being comprised of the following divalent radicals:

(A) 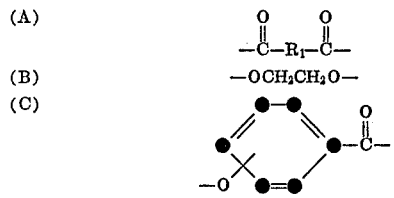

(B) —OCH$_2$CH$_2$O—

(C) 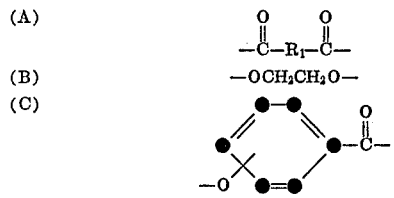

wherein:

R$_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of R$_1$ is the divalent aromatic radical, the range of radical (C) is from 20 to 80 mole percent, based on the total moles of (A) and (C) combined, in radical (C) the oxygen is linked either in the meta or para position with regard to the carbonyl group, and at least 60 mole percent of radical (C) is the para isomer.

The copolyester of the first embodiment wherein the radical (C) is within the range of 20 to 80 mole percent is useful as a molding plastic due to a combination of unobvious flexural modulus, unobvious tensile strength and desirable impact strength.

In one preferred aspect of the first embodiment, R$_1$ is a divalent aromatic radical having 6 to 16 carbon atoms, at least 90 mole percent of radical (C) is the para isomer, and the range of radical (C) is from 30 to 68 mole percent. In this aspect the copolyester is also useful as a molding plastic due to a combination of unobvious flexural modulus, unobvious tensile strength and desirable impact strength.

In one more preferred aspect of the first embodiment, R$_1$ is a divalent aromatic radical having 6 carbon atoms and the range of radical (C) is from 45 to 65 mole percent. In this aspect the copolyester is even more useful as a molding plastic due to a combination of unobvious flexural modulus, unobvious tensile strength and unobvious impact strength.

In the most preferred aspect of the first embodiment the amount of radical (C) is about 60 mole percent, based on the total moles of radical (A) and radical C) combined, and the copolyester is comprised of the following divalent radicals:

(A) 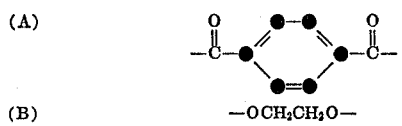

(B) —OCH$_2$CH$_2$O—

(C) 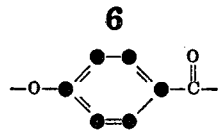

In this aspect the flexural modulus, tensile strength and impact are at a maximum.

The copolyester of the first embodiment, wherein the radical (C) is within the range of 20 to 80 mole percent, is also useful for preparing films. Additionally, films of these copolyesters are even more useful when the range of radical (C) is from 20 to 30 mole percent. In this range the oriented copolyester film exhibits a combination of solvent splicability and desirable mechanical properties. When radical (C) is about 25 mole percent the films exhibit the most desirable combination of solvent splicability and excellent mechanical properties.

In one preferred aspect of the film forming embodiment, R$_1$ is a divalent aromatic radical having 6 to 16 carbon atoms and at least 90 mole percent of radical (C) is the para isomer. In this aspect the range of radical (C) can be from 20 to 30 mole percent.

In one more preferred aspect of the film forming embodiment, R$_1$ is a divalent radical having 6 carbon atoms.

In the most preferred aspect of the film forming embodiment, wherein the film exhibits the most desirable combination of solvent splicability and mechanical properties, the copolyester can be described as a copolyester having an inherent viscosity of at least 0.4 and having no substantial amount of aliphatic to aromatic oxygen linkages, the copolyester being comprised of the following divalent radicals:

(A) 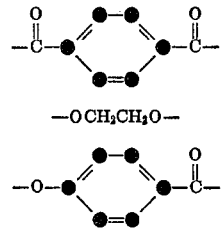

(B) —OCH$_2$CH$_2$O—

(C) 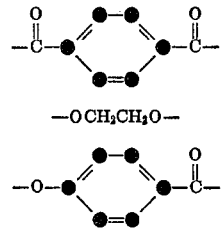

the amount of radical (C) being about 25 mole percent, based on the total moles of radical (A) and radical (C) combined.

As noted above, the copolyesters of this invention, containing no substantial amount of aliphatic to aromatic oxygen linkages, are quite different from the copolyesters obtained from the ester interchange procedures of the prior art which contain substantial amounts of aliphatic to aromatic oxygen linkages.

Very broadly, the copolyesters of this invention are prepared by a process comprised of two steps.

The first step of the process comprises preparing a fragmented polyester by contacting an acyloxy benzoic acid with a starting polyester having an inherent viscosity of at least about 0.2. The second step of the process comprises preparing the copolyester by increasing the inherent viscosity of the fragmented polyester to at least 0.4. The starting polyester is formed from a dicarboxylic acid and ethyleen glycol and consequently contains repeating units composed of the divalent radical remaining after the removal of the hydroxyl groups from the dicarboxylic acid, which is attached to the divalent radical remaining after removal of the hydrogen atoms from the ethylene glycol. Upon contact, the starting polyester and acyloxy benzoic acid react by acidolysis to form the fragmented copolyester. The inherent viscosity of the fragmented copolyester is increased to form the copolyester of this invention comprised of three kinds of divalent radicals. The first divalent radical, herein designated radical (A), comes from the dicarboxylic portion of the starting polyester and is the divalent radical remaining after the removal of the hydroxyl groups from the dicarboxylic acid. The second divalent radical, herein designated radical (B), comes from the ethylene glycol portion of the polyester and is the divalent radical remaining after removal of the hydrogen atoms from the ethylene glycol. The third divalent radical, herein designated radical (C), comes from the acyloxy benzoic acid and is the divalent radical remaining after removal from the acyl and hydroxy groups from the acyloxy benzoic acid.

The starting polyester is comprised of repeating units corresponding to the formula $$-\overset{O}{\underset{\|}{C}}-R_1-\overset{O}{\underset{\|}{C}}-O-CH_2CH_2-O-$$

where $R_1$ is the sale as described earlier and will be recognized as the divalent radical remaining after removal of the carboxylic groups from the dicarboxylic acid used to prepare the starting polyester. Examples of dicarboxylic acids that can be used to prepare the starting polyester include malonic; dimethylmalonic; succinic; glutaric; adipic; 2-methyladipic; trimethyladipic; pimelic; 2,2-dimethylglutaric; 3,3-diethylsuccinic; azelic; sebacic; suberic; 1,3-cyclopentanedicarboxylic; 1,3 - cyclohexanedicarboxylic; 1,4-cyclohexanedicarboxylic; terephthalic; isophthalic; 4-methylisophthalic; t-butylisophthalic; 2,5-norbornanedicarboxylic; 1,4-naphthalic; diphenic; 4,4'-methylenedibenzoic; diglycolic; 2,5-naphthalenedicarboxylic; 2,6-naphthalenedicarboxylic; 2,7 - naphthalenedicarboxylic; dibenzoic acid; bis-(p-carboxyphenyl) methane; ethylenebis-p-benzoic acid; and 1,5-naphthalene dicarboxylic acids. If desired a halogenated aromatic dicarboxylic acid may be used such as dichloroterephthalic aid or dibromoterephthalic acid. Preferably not over 25 mole percent halogenated aromatic dicarboxylic acid is used. The ester-forming derivatives which may be used include the esters, such as the methyl, ethyl, phenyl, and monomeric ethylene glycol esters. Examples of these esters include dimethyl 1,4-cyclohexanedicarboxylate; dimethyl 2,6-naphthalenedicarboxylate; dimethyl 4,4'-sulfonyldibenzoate; dimethyl isophthalate; dimethyl terephthalate; and diphenyl terephthalate. Other derivatives may also be used to prepare these polyesters.

Ethylene glycol is the diol used to form the starting polyester of this invention.

The starting polyesters of this invention can be prepared by conventional processes well known in the art, such as direct esterification or ester interchange, followed by polycondensation.

The acyloxy benzoic acid that reacts with the starting polyester and provides the radical (C) in the final copolyster corresponds to the structure

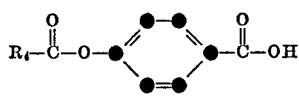

or

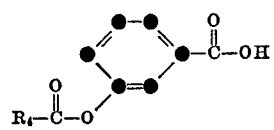

wherein $R_4$ is a monovalent alkyl radical of 1 to 8 carbon atoms or a monovalent aromatic radical of 6 carbon atoms and at least 60 mole percent of the acyloxy benzoic acid is the para isomer.

In another embodiment $R_4$ is a monovalent alkyl radical having 1 to 8 carbon atoms and in another embodiment $R_4$ is a monovalent alkyl radical having 1 to 4 carbon atoms. In still another embodiment at least 90 mole percent of the acyloxy benzoic acid can be the para isomer. Preferably, $R_4$ is a monovalent alkyl radical having one carbon in which case the acyloxy benzoic acid is p-acetoxybenzoic acid.

Examples of acyloxy benzoic acids include meta and para acetoxy benzoic acid; meta and para propionyloxy benzoic acid; meta and para butyryloxy benzoic acid; and meta and para benzoyloxybenzoic acid.

The acyloxy benzoic acids can be prepared by conventional processes, such as reaction between p-hydroxybenzoic acid and a carboxylic anhydride, such as acetic anhydride. Other process for preparation of the acyloxy aromatic carboxylic acids are well known in the art.

The thermodynamic conditions that can be used in the first step of preparing the fragmented polyester by contacting the starting polyester with the acyloxy benzoic acid can vary widely depending on the desires of the practitioner of the invention. Although other temperatures can be used, the starting polyester and the acyloxy benzoic acid can be contacted within a temperature range of about 240° to about 320° C. In another embodiment the starting polyester and the acyloxy benzoic acid can be contacted within the temperature range of 250° C. to 280° C. Temperatures higher than about 320° C. can be undesirable since temperatures this high may cause degradation of the copolyester. Temperatures below about 240° C. can be undesirable since the reaction rate between the acyloxy benzoic acid and the starting polyester will be lowered. A wide variety of pressures can be used to prepare the copolyester prepolymers. Atmospheric pressure is typically used during the first step of the process. A wide variety of times can be used to prepare the copolyester prepolymer. Of course, the starting polyester and the acyloxy benzoic acid must be in contact for a long enough period of time to react to form the copolyester prepolymer.

The acyloxy aromatic carboxylic acid can be contacted with the starting polyester using a wide variety of methods well known in the art. In most instances the starting polyester and acyloxy benzoic acid are solids at standard temperature and pressure. In this instance the two solids can be mixed and heated until molten. In other instances the starting polyester and acyloxy benzoic acid can be in liquid form, in which case the two liquids can be contacted by admixing the liquids.

As noted above, the second step of the process involves increasing the inherent viscosity of the fragmented polyester to at least 0.4 to form the copolyester of the invention which is suitable for forming into useful articles. The increase in inherent viscosity of the fragmented polyester can be accomplished by any one of several conventional methods well known in the art to build up the molecular weight of linear polyesters. When the fragmented polyester is a hot, molten material, the fragmented polyester can be conveniently built up by a technique similar to the polycondensation step in the production of poly(ethylene terephthalate). In this technique a subatmospheric pressure is created above the fragmented polyester and the fragmented polyester is heated while polycondensation products are removed overhead. The fragmented polyester can be stirred if desired.

When the fragmented polyester takes the form of a solid, molecular weight build up can be conveniently accomplished by fluidization techniques well known in the art such as are used to build up the molecular weight of poly(ethylene terephthalate).

The thermodynamic conditions that can be used to prepare the copolyester by increasing the inherent viscosity of the fragmented polyester can also vary widely depending on the desires of the practitioner of the invention. Although other temperatures can be used, in one embodiment a temperature in the range of about 200° to about 320° C. can be used, and in another embodiment a temperature in the range of 200° to 280° C. can be used. As in the case of the preparation of some fragmented polyesters, temperatures above 320° C. can be used but tend to cause degradation of the fragmented polymer. Temperatures below 200° C. produce less desirable rates of increase in the inherent viscosity of the fragmented polyester. Although other pressures can be used, a pressure in the range of about 800 mm. to 0.05 mm. Hg can be conveniently used. It is particularly convenient to conduct the first step of the invention at approximately atmospheric pressure and then start the second step of the invention at the same pressure and gradually reduce the pressure as the inherent viscosity of the fragmented polyester builds up. The time that can be used is not critical but, of course, sufficient time must be allowed to build up the fragmented polyester to the inherent viscosity desired for the copolyester of the invention.

The inherent viscosity of the copolyester of this invention is at least 0.4, but can vary widely upward from 0.4. In one embodiment the inherent viscosity of the copolyester is at least 0.5. The inherent viscosity of the copolyester can, if desired, be increased still further to an inherent viscosity of 0.6, 0.7, 1.0, or even higher, using techniques well known in the art for increasing the molecular weight of linear polyesters.

The inherent viscosity of the polyesters of this invention are measured at 25° C. using 0.50 gram of polymer per 100 ml. of a solvent composed of 60 volumes of phenol and 40 volumes of tetrachloroethane.

Although the first and second steps of this invention can be conducted without use of a catalyst other than the catalyst in the polyester itself, a catalyst such as cobalt may be used in the second step to facilitate inherent viscosity build-up of the fragmented polyester.

The process used to prepare the copolyester of this invention can be used to prepare many other copolyesters.

In a typical example of the process for preparing the copolyesters of this invention granular poly(ethylene terephthalate) having an inherent viscosity of about 0.6 and p-acetoxybenzoic acid are placed in a stirred reaction vessel and heated to about 275° C. for about one hour or until most of the acetic acid has distilled from the vessel and a low melt viscosity fragmented polyester has been obtained. A vacuum is then applied and stirring continued until the inherent viscosity of the copolyester prepolymer is built up to form the copolyester having an inherent viscosity of about 0.6.

The copolyesters of this invention are useful for preparing molded objects. As noted earlier, molded objects of some specific copolyesters wherein the range of radical (C) is within 20 to 80 mole percent exhibit mechanical properties which are unobvious over the prior art.

The copolyesters of this invention are also useful for preparing films. Extruded, quenched films of the copolyesters exhibit desirable mechanical properties. For example, tough, flexible films can be pressed at 400° C. from a copolyester prepared from poly(ethylene terephthalate) and 80 mole percent p-acetoxybenzoic acid. Some of the copolyesters prepared by the process of this invention are particularly suitable for preparation of biaxially oriented, heatset motion picture films due to the desirable mechanical properties of the films and a solvent splicable character. Monoaxially oriented film may be fibrillated to produce twine.

The copolyesters of the invention are also useful in preparing fibers, foamed plastic products, coatings and adhesives.

The copolyesters of this invention are used to prepare useful articles using conventional methods and conventional apparatus. For instance, the copolyesters can be formed into fibers by conventional melt spinning techniques and subsequently drafted, heatset and further processed according to techniques well known in the art. The copolyesters can be injection molded using conventional equipment and techniques.

The copolyesters of this invention also may contain nucleating agents, fillers, pigments, glass fibers, asbestos fibers, antioxidants, stabilizers, plasticizers, lubricants, fire-retardants, and other additives. The copolyesters also may be used as reinforcing agents to increase the strength and stiffness of other plastics. For example, the tensile strength and flexural modulus of poly(tetramethylene terephthalate) are substantially increased by up to 50 weight percent or more of the final copolyester of poly(ethylene terephthalate) and 60 mole percent p-acetoxybenzoic acid.

Because of their surprisingly low melt viscosities, some of the copolyesters of this invention also may be used to reduce the melt viscosity of other polymers, such as, for example, polyesters of aromatic diols and aromatic dicarboxylic acids. For instance, the melt viscosity of the final copolyester of poly(ethylene terephthalate) and 60 mole percent p-acetoxybenzoic acid at 275° C. and a shear rate of 1000 sec.$^{-1}$ is about $\frac{1}{20}$ that of poly(ethylene terephthalate) alone.

In the following examples the starting polyesters are prepared by the conventional techniques of ester interchange and polycondensation of the ethylene glycol and methyl esters of the dicarboxylic acids. A conventional zinc acetate/antimony acetate catalyst is used.

The copolyesters are dried in an oven at 100° C. overnight prior to injection molding to give bars for testing. ASTM procedures are used for measuring the mechanical properties of the copolyesters. The specific procedures are: tensile strength, ASTM D1708; flexural modulus, ASTM D790; Izod impact strength, ASTM D256 Method A.

The following examples are presented to illustrate the process for preparing the copolyesters of the invention and the unobvious mechanical properties of the copolyesters of this invention.

EXAMPLE 1

This example illustrates the preparation of a copolyester from poly(ethylene terephthalate) and 60 mole percent of p-acetoxybenzoic acid.

A mixture of 69.1 g. (0.36 mole) of poly(ethylene terephthalate) (I.V. 0.60) and 97.2 g. (0.54 mole) p-acetoxybenzoic acid is placed in a 500-ml. flask equipped with a stirrer, a short distillation column and an inlet for nitrogen. The flask is evacuated and purged three times with nitrogen before being lowered into a Woods-metal bath maintained at 275° C. As the mixture is stirred at 275° C. in a nitrogen atmosphere, acetic acid slowly distills from the flask. After 60 min., most of the acid has evolved and a low melt viscosity fragmented polyester is obtained. A vacuum of 0.5 mm. is then applied at 275° C., and stirring is continued for 4 hr. A white, opaque, high melt viscosity copolyester is obtained. The copolyester has an inherent viscosity of 0.62.

Fibers melt spun at 260° C. have the following properties as spun (undrafted): tenacity 3.3 g./den., elongation 5%, elastic modulus 196 g./den. Another similarly prepared copolyester, inherent viscosity 0.66, is injection molded at 260° C. with a 1-oz. Watson-Stillman injection-molding machine to give 2½ x ⅜ x $\frac{1}{16}$-in. tensible bar and 5 x ½ x ⅛-inch flexure bars. The following table lists the properties of these bars.

Tensile strength, $10^3$ p.s.i. _____ 34.3
Flexural modulus, $10^5$ p.s.i. _____ 17.8
Notched Izod impact strength, ft.-lb./in. of notch __ 4.4
Oxygen index, percent _____ 32

The experiment is repeated using copolyesters containing 30, 40, 50, 55, 65, 70 and 80 mole percent p-acetoxy benzoic acid. The tensile strength, flexural modulus and notched Izod impact strength of these copolyesters are not as high as with 60 mole percent, but these properties are much higher than the properties of conventional polyesters and are quite suitable for typical applications such as molding, extruding into fibers and the like. These data are used to prepare the curves of FIGS. 2, 3 and 4 for the copolyesters of the invention.

When the terephthalic acid is replaced in part by an alicyclic or aliphatic dicarboxylic acid disclosed to be useful in this invention, the mechanical properties of the copolyesters are not necessarily as high as above but are unobviously high when compared to the mechanical properties of the copolyesters of the prior art. Other acyloxy benzoic acids within the scope of this invention produce copolyesters having unobvious mechanical properties.

Unlike most polyesters, the mechanical properties of the copolyesters of this invention can in some instances be appreciably affected by small variations in molding conditions and physical dimensions of the bars used for testing. For example, when the above copolyester containing 60 mole percent p-hydroxybenzoic acid is molded in a 6-oz. New Britain 175 reciprocating screw injection-molding machine at 260° C. into molds cooled with water at 15° C., the following properties are obtained with 8½ x ¾ x ⅛-inch tensile bars; tensile strength of 26,500 p.s.i. and flexural modulus of $19.3 \times 10^5$ p.s.i. Although applicants are uncertain as to why the larger 8½ x ¾ x ⅛-inch bars give different tensile strength values than the $\frac{1}{16}$-in. bars used to obtain values for the above table and in FIG. 3, one theory of particular merit is that the degree of orientation affects the level of properties. Thus, pursuing this theory, thin bars generally would exhibit higher tensile strengths then thick bars.

EXAMPLE 2

This example illustrates the preparation of a copolyester from poly(ethylene terephthalate) and 30 mole percent of p-propionyloxybenzoic acid.

A mixture of 120.9 g. (0.63 mole) of poly(ethylene terephthalate) (I.V. 0.60), 52.4 g. (0.27 mole) p-propionyloxybenzoic acid, and 0.045 g. cobalt carbonate is placed in a 500-ml. flask equipped with a stirrer, a short distillation column, and an inlet for nitrogen. The flask is evacuated and purged three times with nitrogen before being lowered into a Woods-metal bath maintained at 275° C. As the mixture is stirred at 275° C. in a nitrogen atmosphere, propionic acid slowly distills from the flask. After 60 min., most of the acid has evolved and a low melt viscosity fragmented polyester is obtained. A vacuum of 0.5 mm. is then applied at 275° C., and stirring is continued for 4 hr. to build up the inherent viscosity of the fragmented polyester to form the copolyester of the invention. A white, opaque, medium melt viscosity copolyester of 0.26 inherent viscosity is obtained. The copolyester is ground to pass a 20-mesh screen for subsequent additional solid phase built-up to form the copolyester. Solid-phase built-up of the copolyester is accomplished by heating the particles under a reduced pressure of 0.05–0.1 mm. Hg at 210° C. for 8 hr. The copolyester has an inherent viscosity of 0.51 and a crystalline melting point of 227° C.

Fibers are melt spun, drafted and heatset by conventional techniques. The fibers have the following properties: tenacity 3.1 g./den., elongation 11%, elastic modulus 55 g./den., and flow point 190° C.

Pressed films of this copolyester are clear, tough, flexible, and soluble in methylene chloride. Strips of film are drafted 300% in steam, clamped to a frame to prevent shrinkage, and then crystallized by heating in an oven at 145° C. for 5 min. The strips are easily spliced together with methylene chloride. FIGS. 2–4 give plastic properties.

Although the mechanical properties may vary, the final copolyester is suitable for film and molding applications when alicyclic or aliphatic dicarboxylic acids within the scope of this invention are used in place of a portion of the terephthalic acid. Other acyloxy aromatic carboxylic acids useful in this invention give similar results.

EXAMPLE 3

This example illustrates the preparation of a copolyester from a mixture of aromatic dicarboxylic acids.

A copolyester is prepared with 0.6 mole of a 80/20 molar mixture of p-acetoxybenzoic acid/m-acetoxybenzoic acid and 0.4 mole of copoly(80/20)ethylene terephthalate/ethylene isophthalate), I.V. 0.76, by the procedure described in Example 1. The copolyester has an inherent viscosity of 0.60. A film pressed at 300° C. is quite tough. Molded bars exhibit desirable mechanical properties.

Other mixtures of suitable aromatic dicarboxylic acids can be used. Similar results are achieved when mixtures of suitable aliphatic or alicyclic acids are used in place of a portion of the aromatic dicarboxylic acids.

EXAMPLE 4

This example illustrates the preparation of a copolyester from a mixture of aromatic and aliphatic dicarboxylic acids.

Example 1 is repeated, except the acyloxy benzoic acid is p-acetoxybenzoic acid and the starting polyester is formed from ethylene glycol, 60 mole percent 4,4'-sulfonyldibenzoic acid, and 40 mole percent 1,12-dodecanedicarboxylic acid. The copolyester has an inherent viscosity of 0.53. Molded bars exhibit desirable mechanical properties.

EXAMPLE 5

This example illustrates the preparation of a copolyester using a mixture of the para and meta isomers of an acyloxy carboxylic acid.

The procedure of Example 2 is used to prepare a copolyester with 0.8 mole of poly(ethylene terephthalate) and 0.2 mole (20 mole percent) of a 90/10 molar mixture of p-benzoxybenzoic acid/m-acetoxybenzoic acid. A copolyester with an inherent viscosity of 0.51 is obtained. Pressed films of the copolyester are clear and flexible. Molded objects have mechanical properties suitable for typical commercial applications.

Other acyloxy benzoic acids within the scope of the invention produce similar results.

EXAMPLE 6

This example illustrates the preparation of a copolyester using a mixture of the para and meta isomers of an acyloxybenzoic acid.

The procedure of Example 1 is used to prepare a copolyester with 0.2 mole of poly(ethylene terephthalate) and 0.8 mole of a 75/25 molar mixture of p-acetoxybenzoic acid/m - acetoxybenzenoic acid. A copolyester with an inherent viscosity of 0.55 is obtained. Injection-molded bars have the following properties: tensile strength 28,000 p.s.i., elongation 9%, and flexural modulus $14.3 \times 10^5$ p.s.i.

EXAMPLE 7

This example illustrates the preparation of a copolyester using naphthalenedicarboxylic acid as a portion of the dicarboxylic acid.

The procedure of Example 1 is used to prepare a copolyester with 0.6 mole of p-acetoxybenzoic acid and 0.4 mole of the polyester of ethylene glycol and a 50/50 mole mixture of terephthalic acid and 2,6-naphthalenedicarboxylic acid. A high molecular weight copolyester with an inherent viscosity of 0.60 is obtained. A film pressed at 300° C. is white, opaque, and tough. Molded bars exhibit desirable mechanical properties which are unobviously high when compared to a similar copolyester of the prior art.

Other aromatic dicarboxylic acids within the scope of this invention can be substituted for the naphthalenedicarboxylic acid with similar results obtained.

EXAMPLE 8

This example illustrates the excellent film properties which can be obtained from the copolyesters of this invention. The procedure of Example 2 is used to prepare a copolyester from 75 mole percent poly(ethylene terephthalate) and 25 mole percent of p-acetoxybenzoic acid. The copolyester has an inherent viscosity of 0.55. A 20-mil film is pressed. This film is biaxially stretched 300% at 140° C. with a Long Machine. After the film is clamped to a frame to prevent shrinkage and heat-set for 1 min. at 210° C., it has a yield strength of 14,500 p.s.i., break strength of 24,500 p.s.i., 66% elongation, 8.1×10⁵ p.s.i. tensile modulus, and 185° C. heat-distortion temperature at 50 p.s.i. load. The film can be spliced with methylene chloride.

Comparative films of the copolyesters of the prior art exhibit less desirable mechanical properties.

EXAMPLE 9

This example illustrates the preparation of a copolyester of a naphthalene dicarboxylic acid.

The general procedure of Example 1 is used to prepare in a one liter flask a copolyester with 0.9 mole of p-acetoxybenzoic acid and 0.6 mole of the polyester of 2,6-naphthalene dicarboxylic acid and ethylene glycol. The copolyester has an inherent viscosity of 0.54. Injection-molded as described in Example 1, the copolyester has a tensile strength of 24,700 p.s.i., an elongation of 14%, a flexural modulus of 19.1×10⁵ p.s.i., a notched Izod impact strength of 0.7 ft. lb./in. of notch, and an oxygen index of 42.

EXAMPLE 10

This example illustrates the preparation of a copolyester of a brominated aromatic acid.

The general procedure of Example 1 is used to prepare a copolyester with 60 mole percent of p-acetoxybenzoic acid and 40 mole percent of the copolyester of poly(ethylene terephthalate) modified with 5 mole percent of 2,5-dibromoterephthalic acid. The copolyester has an inherent viscosity of 0.47. Injection-molded as described in Example 1, the copolyester has a tensile strength of 18,100 p.s.i., an elongation of 17%, a flexural modulus of 7.2×10⁵ p.s.i., and an oxygen index of 35.

Although the invention has been described in considerable detail with particular reference to certain preferred embodiments thereof, variations and modifications can be effected within the spirit and scope of the invention.

We claim:

1. A copolyester having an inherent viscosity of at least 0.4 measured at 25° C. using 0.5 gram of polymer per 100 ml. of a solvent composed of 60 volumes of phenol and 40 volumes of tetrachloroethane and having less than about 3 mole percent of aliphatic to aromatic oxygen linkages, the copolyester comprised of the following divalent radicals:

(A)　　　　　$-\overset{O}{\overset{\|}{C}}-R_1-\overset{O}{\overset{\|}{C}}-$ (B)　　　　　$-OCH_2CH_2O-$ (C)　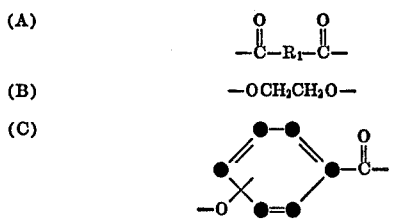

wherein:

$R_1$ is a divalent alicyclic radical having 4 to 20 carbon atoms, a divalent aliphatic radical having 1 to 40 carbon atoms, or a divalent aromatic radical having 6 to 16 carbon atoms with the carbonyl linkages separated by at least 3 carbon atoms, with the proviso that at least 50 mole percent of $R_1$ is the divalent aromatic radical, the range of radical (C) is from about 20 to about 80 mole percent, based on the total moles of (A) and (C) combined, in radical (C) the oxygen is linked either in the meta or para position with regard to the carbonyl group, and at least 60 mole percent of radical (C) is the para isomer.

2. The copolyester of claim 1 wherein:

$R_1$ is a divalent aromatic radical having 6 to 16 carbon atoms, at least 90 mole percent of radical (C) is the para isomer, and the range of radical (C) is from 30 to 70 mole percent.

3. The copolyester of claim 2 wherein $R_1$ is a divalent aromatic radical having 6 carbon atoms.

4. The copolyester of claim 3 wherein radical (A) is

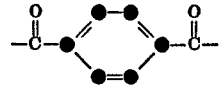

5. The copolyester of claim 4 wherein the range of radical (C) is from 45 to 65 mole percent.

6. A copolyester having an inherent viscosity of at least 0.4 measured at 25° C. using 0.5 gram of polymer per 100 ml. of a solvent composed of 60 volumes of phenol and 40 volumes of tetrachloroethane and having less than about 3 mole percent of aliphatic to aromatic oxygen linkages, the copolyester comprised of the following divalent radicals:

(A)　

(B)　

(C)　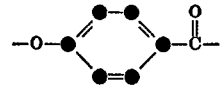

the amount of radical (C) being about 60 mole percent, based on the total moles of radical (A) and radical (C) combined.

7. The copolyester of claim 1 wherein:

$R_1$ is a divalent aromatic radical having 6 to 16 carbon atoms, at least 90 mole percent of radical (C) is the para isomer, and the range of radical (C) is from 20 to 30 mole percent.

8. The copolyester of claim 7 wherein $R_1$ is a divalent aromatic radical having 6 carbon atoms.

9. The copolyester of claim 8 wherein radical (A) is

10. A copolyester having an inherent viscosity of at least 0.4 measured at 25° C. using 0.5 gram of polymer per 100 ml. of a solvent composed of 60 volumes of phenol and 40 volumes of tetrachloroethane and having less than about 3 mole percent of aliphatic to aromatic oxygen linkages, the copolyester comprised of the following divalent radicals:

(A)　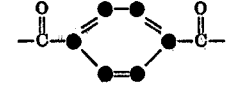

(B)　

(C) 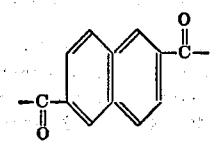
the amount of radical (C) being about 25 mole percent, based on the total moles of radical (A) and radical (C) combined.
11. The copolyester of claim 2 wherein (A) is
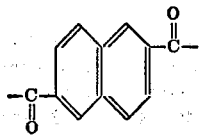
References Cited
UNITED STATES PATENTS
| | | | |
|---|---|---|---|
| 3,345,331 | 10/1967 | Resse, Jr. | 260—47 |
| 3,288,755 | 11/1966 | Griehl et al. | 260—47 |
| 2,728,747 | 12/1955 | Aelony et al. | 260—78.3 |
| 3,637,595 | 1/1972 | Cottis et al. | 260—47 |
LESTER L. LEE, Primary Examiner
U.S. Cl. X.R.
117—161 K; 260—40 R; 264—289